United States Patent
Bowen et al.

(10) Patent No.: US 6,209,038 B1
(45) Date of Patent: Mar. 27, 2001

(54) TECHNIQUE FOR AGGREGATE TRANSACTION SCOPE ACROSS MULTIPLE INDEPENDENT WEB REQUESTS

(75) Inventors: Nicholas S. Bowen, Newtown; Nancy P. Riggs, New Fairfield, both of CT (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/231,080

(22) Filed: Jan. 13, 1999

(51) Int. Cl.[7] .................................................. G06F 15/173
(52) U.S. Cl. ........................... 709/238; 709/237; 709/248
(58) Field of Search .................................... 709/237, 248, 709/238

(56) References Cited

U.S. PATENT DOCUMENTS

| | | |
|---|---|---|
| 5,204,947 | 4/1993 | Bernstein et al. . |
| 5,297,249 | 3/1994 | Bernstein et al. . |
| 5,355,472 | 10/1994 | Lewis . |
| 5,546,582 | 8/1996 | Brockmeyer et al. ............... 709/300 |
| 5,644,715 | 7/1997 | Baugher ............................ 709/228 |
| 5,774,670 * | 6/1998 | Montulli ...................... 395/200.57 |
| 5,826,242 * | 10/1998 | Montulli .............................. 705/27 |
| 5,864,699 | 1/1999 | Merryman .......................... 395/674 |
| 5,920,863 * | 7/1999 | McKeehan et al. .................. 707/10 |
| 5,951,643 | 9/1999 | Shelton et al. ....................... 709/227 |
| 5,953,708 | 9/1999 | Midorikawa et al. ................ 705/26 |
| 5,987,132 | 11/1999 | Rowney ............................... 380/24 |
| 5,991,802 * | 11/1999 | Allard et al. ........................ 709/219 |
| 6,026,379 | 2/2000 | Haller et al. ......................... 705/34 |
| 6,078,954 | 6/2000 | Lakey et al. ......................... 709/223 |

OTHER PUBLICATIONS

Arun Iyengar, "Dynamic Argument Embedding: Preserving State on the World Wide Web", IEEE Internet Computing, Apr. 1997, p. 50–56.*

Steven P. Ketchpel et al., "Shopping Models: A Flexible Architecture for Information Commerce", Proceedings of the 2nd ACM International Conference on Digital Libraries, Jul. 1997, P. 65–74.*

Transaction Processing: Concepts and Techniques, J. Gray and A. Reuter, Index 1066–1070.

* cited by examiner

*Primary Examiner*—Viet D. Vu
*Assistant Examiner*—Jagdish N Patel
(74) *Attorney, Agent, or Firm*—Scully, Scott, Murphy & Presser; Daniel P. Morris, Esq.

(57) ABSTRACT

The invention is a method for coordinating actions among a server supporting multiple independent client server requests and participating clients making multiple independent web requests. The requests are communicated between the client and the server using a protocol that has limited or no defined procedures for passing state information between the client and the servers. A client transmits a request for a first action to a server that requires transaction scope. The server generates transaction identification information and maintains it across the duration of multiple independent and state-less web requests. The client then transmits a request for a additional actions to the server that requires transaction scope, using the transaction identification information preserved in the conversation and maintained by the servers including the client's request in the transaction and transmitting a request by a client to a server that requires transaction completion.

16 Claims, 6 Drawing Sheets

<A HREF="http://www.bankofbowen/cgi-bin/transfer?
WTID=TXCODE">Transfer</A>

Fig. 4a

<A HREF="http://www.bankofbowen/cgi-bin/transfer?
WTID=8439ubn20-snk6jhdsx2k43ke">Tansfer</A>

Fig. 4b

TECHNIQUE FOR AGGREGATE TRANSACTION SCOPE ACROSS MULTIPLE INDEPENDENT WEB REQUESTS

BACKGROUND OF THE INVENTION

1. Field of the Invention

This invention relates to performance of commerce transactions via the Internet, and more particularly, it relates to a technique for aggregating transactional scope across multiple independent Web requests.

2. Description of Prior Art

Electronic commerce is increasing exponentially, especially on the World Wide Web. Many businesses have set up virtual stores on Web sites that allow consumers to shop and purchase products on-line. Most commerce transactions on the World Wide Web utilize the HTTP protocol. HTTP protocol is designed as a state-less or session-less protocol with many benefits, such as rapid connections to web servers and jumping from one server to another as the subsequent hyperlinks in Web documents are referenced.

When clients/customers visit web sites, more frequently they may attempt multiple transactions which they may consider as the same event. For example, a prospective vacationer may visit a web site to purchase airlines tickets and to secure hotel accommodations. In the traditional transaction processing world it would be possible to ensure that either both transactions occur successfully or, that if either transaction fail, neither transaction occurs.

However, the state-less nature of the HTTP protocol creates a situation where independent requests must be sequentially executed, creating a situation where a failure of one transaction may leave the other transaction successfully completed. Furthermore, the design of a complete application to allow clients/customers to roll back previous transactions, e.g., cancel the airline reservation if there are no hotel accommodations available, is difficult and in many cases not possible.

Accordingly, there is a need for a method to coordinate multiple, independent Web transaction requests into a single transaction request initiated from any Web browser, in other words, aggregating transaction scope across multiple independent Web requests.

SUMMARY OF THE INVENTION

The present invention is an online transaction processing system for coordinating, in a client-server environment, multiple requests to a single server such that a client can execute requests within the scope of the same transaction. The system identifies web pages that are to be bound together to accomplish a transaction. Then the system communicates requests between the client and the server using a protocol that has either limited or no defined procedures for passing state information between the client and the servers. HTTP is an example of such a protocol that has limited procedures for passing state information. At the server, multiple independent requests involving one or more independent resource managers are executed and the actions of the resource managers, communicating among themselves in response to the request, are coordinated.

In preferred embodiments of the present invention the client authentication during a conversation and a group transaction requested by the client are coordinated. The client authentication during a conversation is accomplished by transmitting a request for a first action by a client to a server that requires transaction scope. The server then generates transaction identification information, which is maintained across the duration of multiple independent and state-less web requests.

The request for a second action is now transmitted by the client to the server that requires transaction scope. The transaction identification information preserved in the conversation and the transaction identification information maintained by the servers is included in the client's request transaction. Finally, a request is transmitted by a client to a server that requires transaction completion. The communication between the client and the server is performed using a protocol that has either limited or no defined procedures for passing state information between the client and the servers.

These and other features, aspects, and advantages of the present invention will become better understood with regard to the following detailed description, appended claims, and accompanying drawings.

BRIEF DESCRIPTION OF DRAWINGS

The foregoing objects and advantages of the present invention may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 4a is a structure of a hypertext link to a CGI program; and FIG. 4b s the structure of FIG. 4a modified to include a Web transaction identifier (WTID).

DETAILED DESCRIPTION OF THE INVENTION

Figure 1:
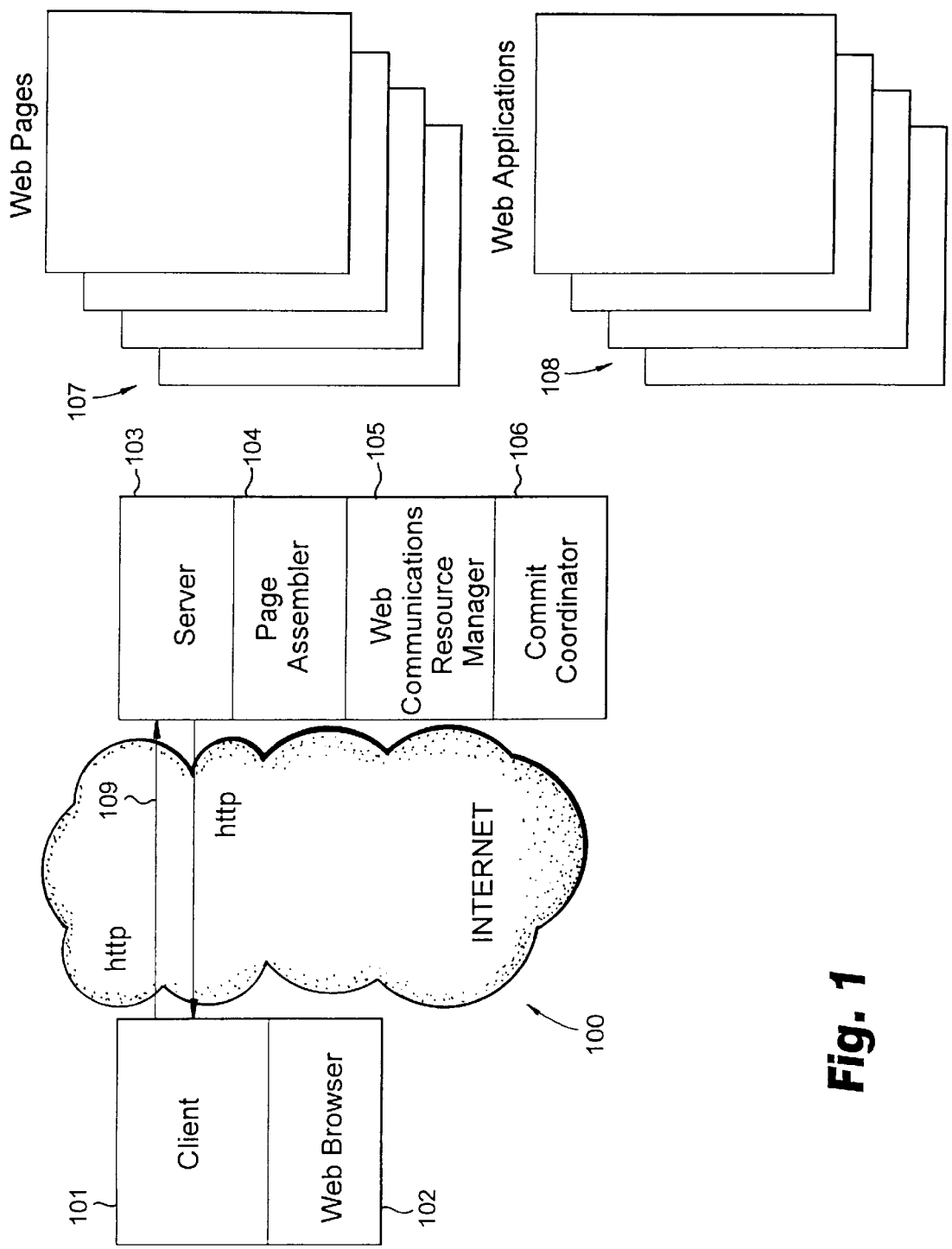
FIG. 1 is an overall architecture diagram of the preferred embodiment of the present invention.

The following are definitions of some terms used herein.

Client— a program or an application that issues commands to a server.

Commit coordinator—a program or an application that coordinates the resolution of a transaction, its typical responsibilities include collecting votes from participants, determining the outcome of the transaction and informing all the participants of the outcome. For a discussion of the distributed two phase commit protocols, see J. Gray & A. Reuter, "Transaction Processing: Concepts & Techniques," Morgan Kaufmann, 1993.

Common gateway interface (CGI)—a mechanism by which a client may request the execution of a program on a Web site. After receiving such request, the Web site runs the CGI program and sends the output of the program back to the client.

Continuation—a new request that a client may send to a server, which was provided by the server in response to a previous request by the client. Hypertext links or hyperlinks are examples of continuations in client-server communications. Whenever a client makes a request to a server, the server may include one or more continuations in its response. Although a continuation provided by the server could be any valid request, useful continuations are generally logically related to the original request by the client.

Conversation—a sequence of communications between a client and a server in which the server responds to each request from the client with a set of continuations, and the client always picks the next request from the set of continuations provided by the server. On the World Wide Web, hypertext links are examples of continuations. A client engages in a conversation with a server whenever it follows the hypertext links provided by the server. More formally, a series of HTML Web pages $h_1, h_2, \ldots, h_n$ constitutes a conversation if:

1. pages $h_1, h_2, \ldots, h_n$ were all viewed by a client; and
2. for all i such that $1<i<=n$, page $h_i$ was obtained by following a hypertext link on page $h_{i-1}$.

In an uninterrupted conversation, the client simply follows n−1 hypertext links to get from page $h_1$ to $h_n$ without ever backtracking. In an interrupted conversation, the client backtracks at least once. Backtracking refers to the process where a client:

1. initially visits a page hi, where $1<=i<n$;
2. views other pages either by following hypertext links, explicitly requesting URLs, or using the Web browser's cache; and
3. returns to page $h_i$ by reloading $h_i$ from memory, such as from the browser's cache.

Home page—a table of contents that guides a World Wide Web user to information that is stored on a Web site. Often, a home page contains multimedia content.

Hyperlink or hypertext link—a network address, such as a Universal Resource Locator, that is embedded in a word, phrase, icon, or picture activated when selected. When a client activates a hyperlink, information corresponding to the hyperlink is returned to the client and displayed using a Web browser.

HyperText Markup Language (HTML)—the language used by Web servers to create and connect Hypertext documents that are viewed by Web clients. Other uses of Hypertext documents are described in U.S. Pat. Nos. 5,204,947, 5,297,249, and 5,355,472 which are herewith incorporated by reference herein.

Transfer Protocol (HTTP)—a protocol used by the World Wide Web to transfer data between computers. HTTP allows a client to obtain data from a server either by requesting a file or invoking a CGI program. HTTP is a stateless protocol, which means that every request from a client to a server is treated independently. No record is kept by the server of previous connections with a particular client. "http:" at the beginning of a URL, indicates the protocol to be used is HTTP.

Internet—a collection of computer networks and gateways connected to each other using the TCP/IP protocol.

Server—a program or an application that performs a task at the command of a client. A Web site may be a server. The term server is not synonymous with the Web servers that support Web sites.

Thread of execution—refers to an execution unit where a Web request will execute. For a CGI request it would be equivalent to the process in which the actual request was executed, while for an ICAPI request it would be the thread on which the request ran.

transaction—refers to an atomic, consistent, isolated, and durable (ACID) unit of work.

Transaction scope—refers to a collection of individual and independent requests that logically constitute a transaction Transaction identifiers refers to an identifier that uniquely identifies a transaction in a network. A transaction identifier is unique for all time i.e., it will not be reused.

Transmission Control Protocol/Internet Protocol (TCP/IP)—is a collection of protocols that divides digital data into packets, routes the packets through the network, and reconstructs the packets at their destination.

Universal Resource Locator-13 (URL) is a way to uniquely identify or address information on the Web. A URL can be considered to be the Web equivalent of an e-mail address. URLs can be cumbersome if they belong to documents buried deep within others, but they can often be accessed with a hyperlink. An example of a URL is:

"http://www.macbeth.com:80/table.html". A URL has four components, starting from the left, they are:

http —the protocol to be used, it is separated from the rest of the URL by colon;

www.macbeth.com—the hostname or Internet Protocol (IP) address of the target host. This component is delimited on the left by // and on the right by / or a colon;

80—optional port number, delimited on the left by a colon and on the right by a /; and table.html—the actual file name or program name.

Web browser—a client program that allows a person to display the hypertext documents on the World Wide Web. A Web browser—acts as an Internet tour guide, complete with pictorial desktops, directories and search tools, which can be used to navigate or surf the Internet.

Web transaction identifiers (WTID)—refers to an identifier that uniquely identifies a transaction in a network. A transaction identifier is unique for all time i.e., it will not be reused.

World Wide Web (Web)—a collection of hypertext documents on the Internet. A hypertext document contains hyperlinks to other documents, which may be used to navigate from document to document. In practice, people seeking information on the Internet can use the Web to switch from server to server and database to database by selecting hyperlinks, which are usually displayed as highlighted words or phrases in documents. The resources on the Web are accessible through URLS. The Web utilizes the HTML to display the information corresponding to URLs and to provide a point-and-click interface to other URLs.

FIG. 1 shows the client 101 using a web browser 102, communicating with the server 103 via Internet 100 using a communications protocol, such as HTTP 109, which has limited or no defined procedures for maintaining client state information. The server 103, includes a page assembler component 104, a Web communication resource manager (CRM) 105, and a commit coordinator 106. The server 103 has access to underlying resource managers, such as web pages 107 and web applications 108. Limited or no defined procedures for maintaining client state information means that for a non-empty subset of types of communications between a client and a server using the protocol, it is difficult or impossible to preserve state variables such as the client's previous requests in a conversation using the procedures defined by the protocol so that the state variables can be subsequently retrieved by a server 103 during the remainder of the conversation.

The Web Communications Resource Manager 105 provides transactional management on the server side and has special logic to aggregate multiple web requests into a single aggregated transaction scope. The Commit Coordinator 106 provides an implementation of a well known distributed two phase commit protocols.

Optionally and commonly, the client 101 may use a Web browser 102 to visually display the results of its request and input new requests.

Figure 2A:
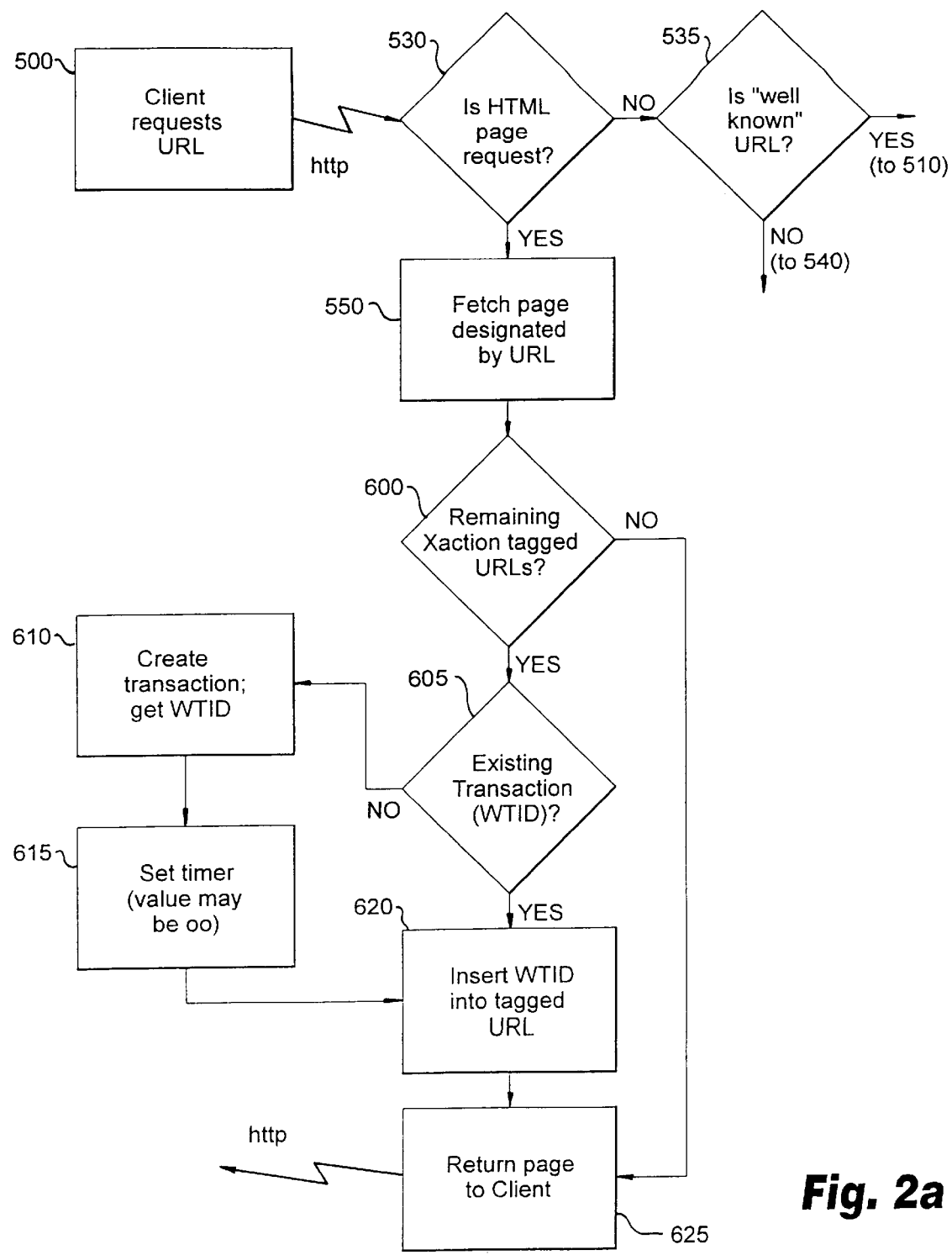
FIGS. 2a–cis a flow diagram of a method for aggregating transaction scope over multiple independent Web requests in accordance with the preferred embodiment of the present invention.
Figure 2B:
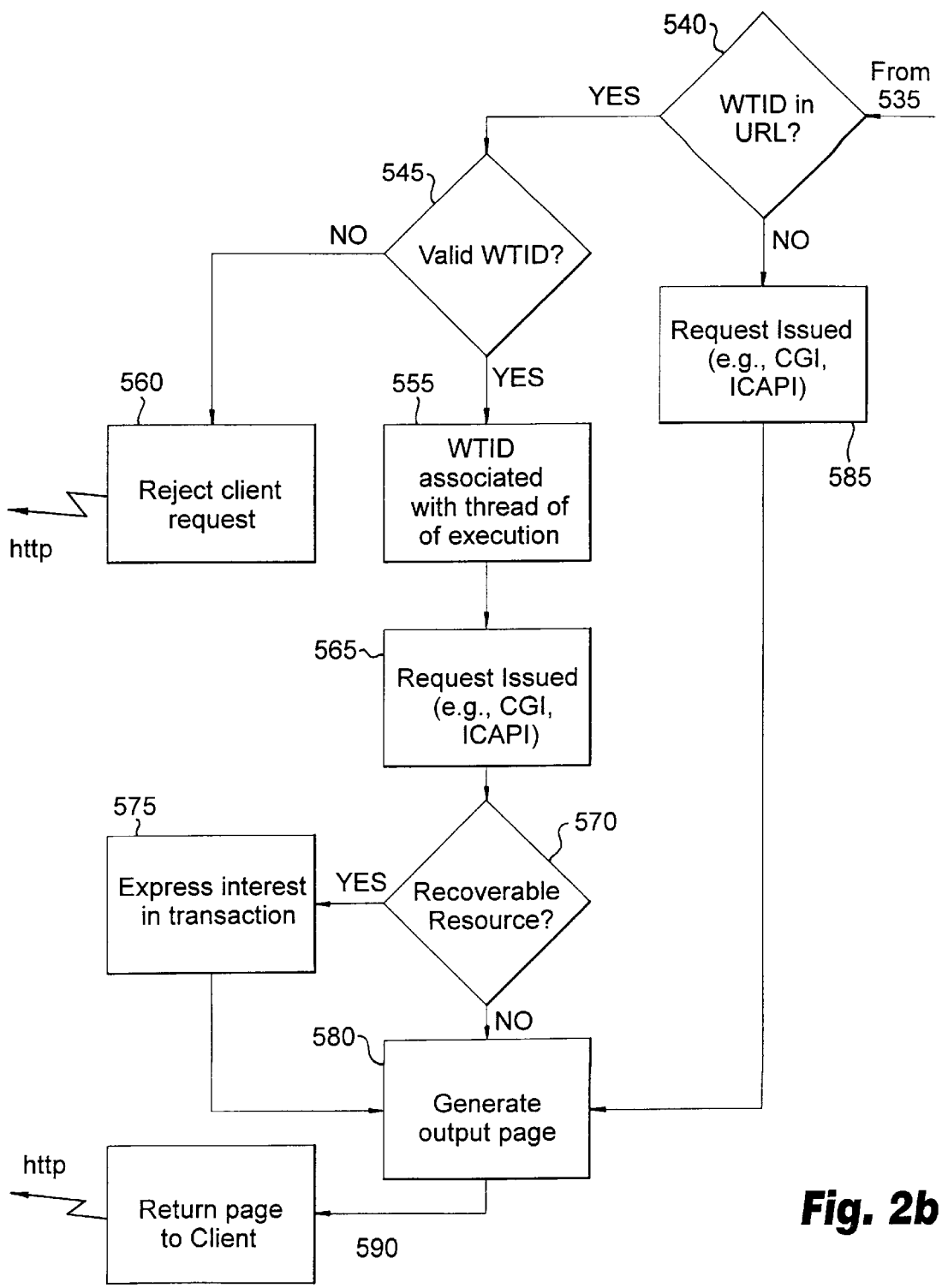
Figure 2C:
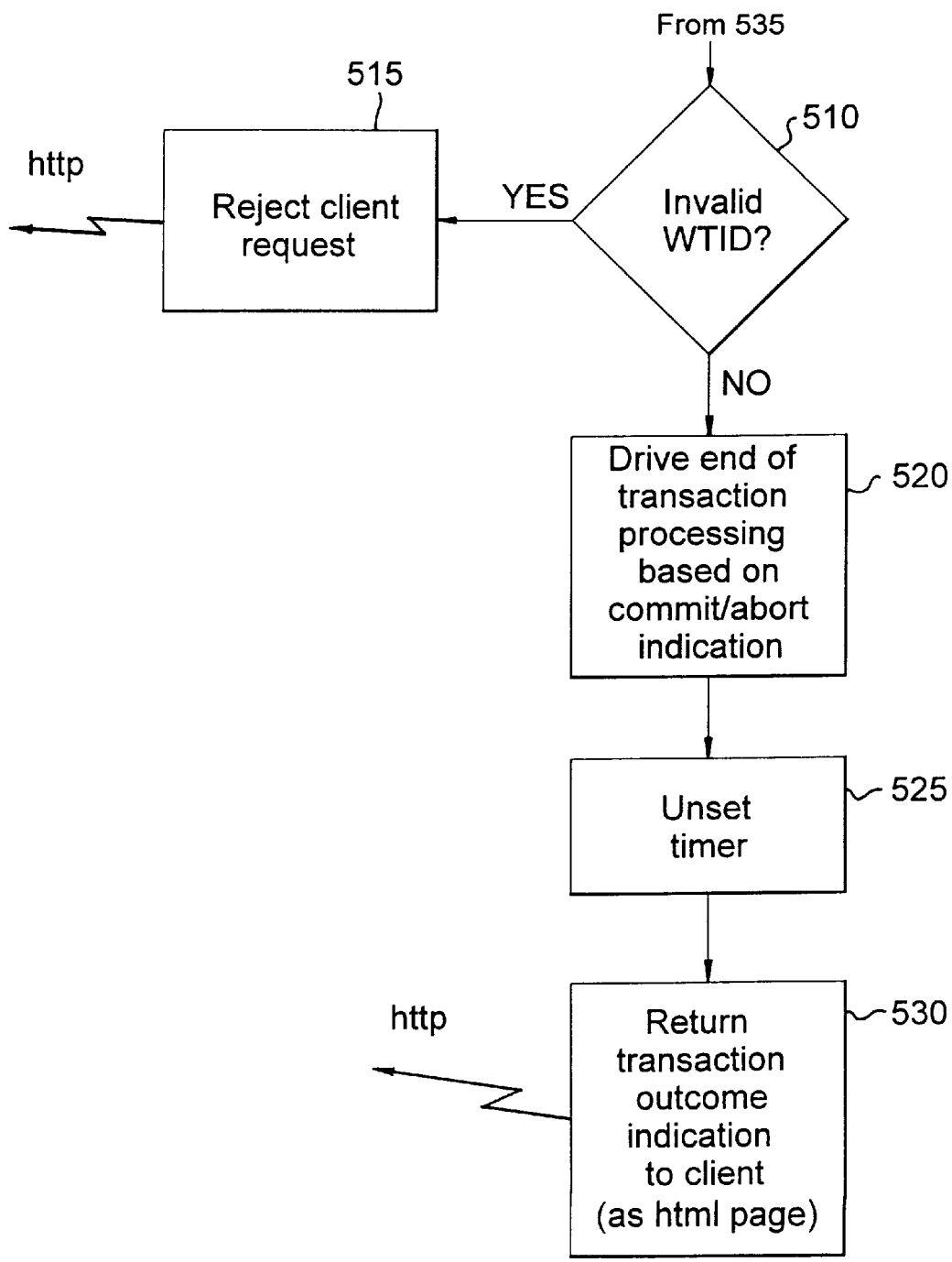

The server 103 coordinates the requests of the client 101 as if they were part of the same transaction. The client 101 issues a request to the server 103 to begin a transaction for a URL using the HTTP protocol by touching the URLs that are designated or tagged as transactional. FIGS. 2a–c show a preferred embodiment of the present invention in which a request is issued in step 500.

In step 530, the server 103 (FIG. 1) determines whether the request is for a static HTML page. If a static Web page has been requested, then the processing continues in step 550, where the HTML page designated by the URL is fetched from the storage medium, such as, but not limited to RAM, disk and CD. However, if it is determined that a static Web page has not been requested then processing continues at step 535, where the server 103 (FIG. 1) contacted by the client determines whether the URL requested is a well-known URL, i.e., a URL with implicit semantics.

In step 600, the server scans the web page to determine if there are any transactional keywords in the page. The page could contain keywords such as "WTID=TXCODE" embedded in the URL, such as the URL 401 shown in FIG. 4a. As mentioned previously, there must exist "well-known" URLs that have implicit transaction semantics. These URLs must be designated by a transactional keyword. They could be represented by COMMIT, ABORT or DONE buttons on a Web page. An end user would select the button in order to end a transaction. If there are no transactional keywords found in step 600, then at step 625 the Web Page is returned to the client 101 (FIG. 1) as would an existing Web Server.

However, if it was determined in step 600, that there are transactional semantics, i.e., additional transactions associated with the Web Page, then a determination is made in step 605 if a WTID exists for this conversation. If a previous request initiated the transaction then a continuation technique may be used to propagate the WTID into the static web page currently being processed. To continue across static pages it may be passed as a WTID keyword on the current URL or it may be based on the client identity using well-known techniques such as client IP address or Netscape cookies.

Where no WTID exists for this conversation, step 610 creates the WTID and optionally, may set a timer at step 615, for the purpose of providing a technique to terminate the work in progress if the client does not respond in an appropriate time. The WTID that was either located in step 605 or created in step 610 is inserted into the Web Page at step 620, resulting in URL 402 as shown in FIG. 4b. Step 625 returns the Web Page to the client 101 (FIG. 1). As shown in FIG. 2(c), if a well-known URL has been entered in step 535 (FIG. 2a), the process continues to step 510 where the Web CRM extracts the Web Transaction Identifier (WTID) from the URL and determines if the transaction it represents is valid. In step 510, two possible validity checks include:

1) a test of whether the transaction has timed out; and
2) a test of whether the transaction identifier is meaningful to this server, i.e., known to or generated by this server.

Additional validity checks may be performed. If the WTID is invalid, in step 515 the server rejects the client request. The conversation may be terminated with an error message.

If the WTID is determined to be valid, then at step 520, the server 103 (FIG. 1) initiates commit processing by invoking a call to the commit coordinator 106 (FIG. 1). The commit coordinator 106 (FIG. 1) handles all commit processing and recovery related to the transaction.

Referring back to FIG. 2(c), at step 525, the Web communication resource manager terminates the timer set for the transaction since the timer is only needed when the transaction is active, i.e., the time prior to transaction commit processing. Once local commit processing is complete as indicated at step 530, the server 103 (FIG. 1) returns an indication of the transaction outcome to the client via the implemented protocol.

Referring back to FIG. 2(a), if the test for a well-known URL in step 535 was negative, then the process continues at step 540, FIG. 2(b), to determine whether WTID is present in the URL, indicating that an application must be scheduled, e.g., a CGI based program. If WTID is not present, then a request is scheduled in step 585, in a manner similar to a standard server, and the output page is generated in step 580. If the generated page contains any indicators of transactional requests, e.g., WTID keywords, then the current WTID must be substituted into the page as described with reference to step 620 FIG. 2(a). The page is then returned to the client in step 590 via the implemented transaction protocol. Returning to step 540, if the WTID is present in the URL, then the validity of the WTID is determined at step 545. These checks may be the same as described with respect to step 510 FIG. 2(c). If at step 545 the WTID is determined to be invalid, then the client request is rejected at step 560. However, if the WTID is valid then it is associated with the current thread of execution in step 555, and the request for scheduling is then issued in step 565.

During the execution of the request, a determination is made at step 570 whether a recoverable resource has been accessed. If a resource has not been accessed, the processing proceeds to step 580. If a recoverable resource has been accessed, then interest in the transaction is expresses at step 575 indicating that the issuing resource manager is a participant in the transaction.

Finally, at step 580, the output page is generated. If the generated page contains any indicators of transactional requests, e.g., WTID keywords, then the current WTID must be substituted into the page in a manner as described with respect to step 620. The page is then returned to the client in step 590.

Figure 3:
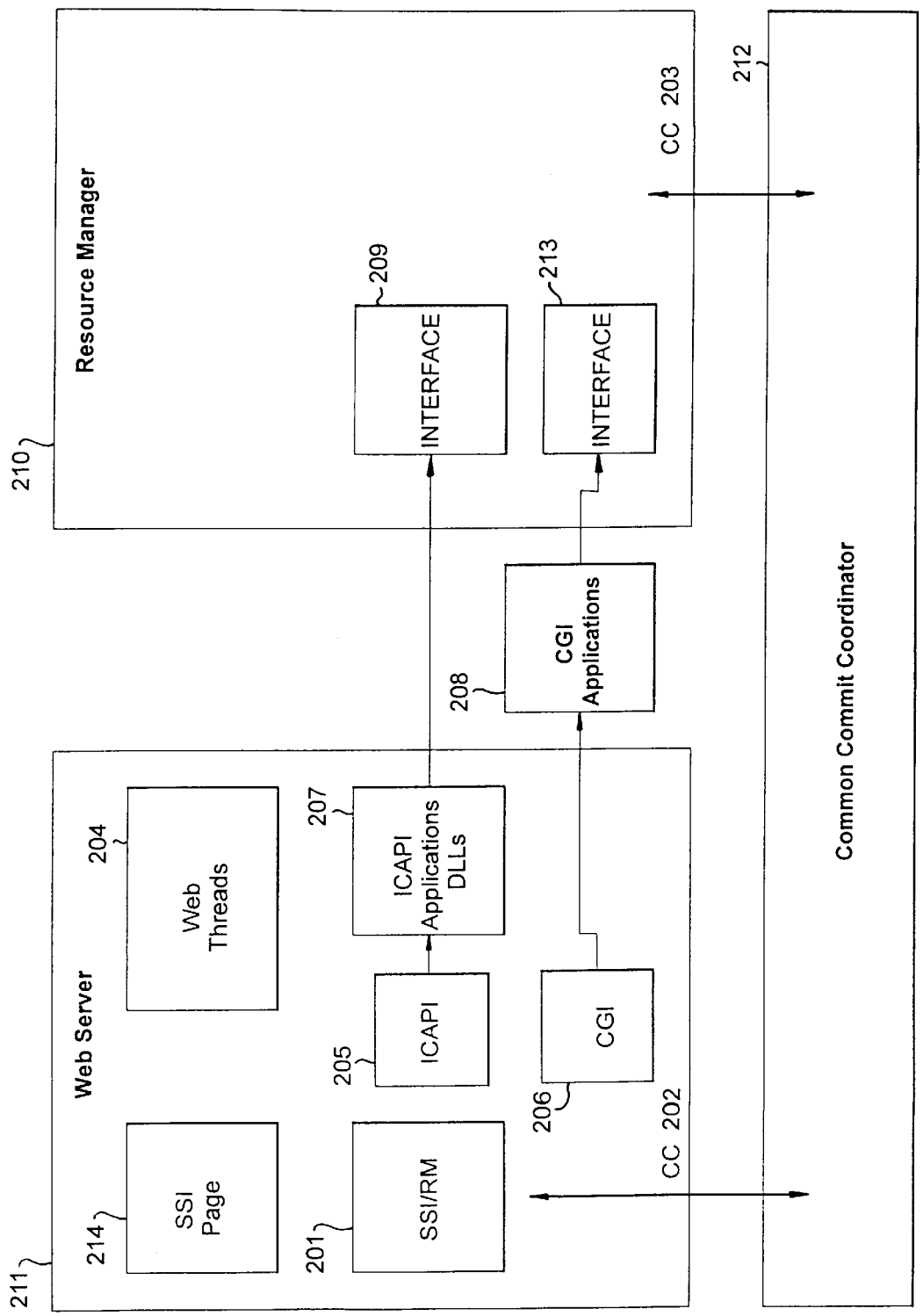
FIG. 3 is a representation of a system of the present invention having features for performing on-line transaction processing over the World Wide Web while aggregating transaction scope.

A system of the present invention for performing on-line transaction processing over the World Wide Web while aggregating transaction scope may be constructed as shown in FIG. 3. The system comprises a Web Server 211, a Resource Manager 210, CGI applications 208, and a Common Commit Coordinator 212. The Web Server 211 and the Common Commit Coordinator 212 components constitute the server 103 (FIG. 1).

The Web Server 211 runs a HTTP daemon, which may optionally provide interfaces for passing parameters to separate internal or external programs. The interfaces CGI 206 and ICAPI 205 allow, based on URL information, user-written applications to execute. The Web Server 211 components may include:

a. the SSI/Page 214 representative of the page assembler 104 (FIG. 1), for scanning web pages to determine if there are any transactional keywords in the page and inserting WTID into Web pages being served:

b. the SSI/RM 201 consists of functions to demarcate transactions and establish timers in a manner described herein in connection with FIG. 2; the SSI/RM 201 and Web Threads 204 together constituting the Web CRM 105 (FIG. 1);

c. the Web Threads 204 consisting of functions used to associate WTID with threads in the case of ICAPI applications 207, or the processes of execution in the case CGI applications 208; and d. ICAPI applications 207 which together with CGI applications 208, represent specific types of Web Applications 108 (FIG. 1) that may dynamically generate Web pages.

The ICAPI applications 207 and the CGI applications 208 may optionally interact with the Resource Manager 210 using interfaces 209, 213 respectively. Interfaces 209, 213 may be different, however they must allow for a WTID associated with the initiating thread or process of execution to be communicated implicitly or explicitly to the Resource Manager 210.

The Common Commit Coordinator 212 interacts with the SSI/RM 201 through the CC interface 202 and with the Resource Manager 210 through the CC interface 203.

While the invention has been particularly shown and described with respect to illustrative and preferred embodiments thereof, it will be understood by those skilled in the art that the foregoing and other changes in form and details may be made therein without departing from the spirit and scope of the invention that should be limited only by the scope of the appended claims.

Having thus described our invention, what we claim as new, and desire to secure by letters patent is:

1. A method for processing transactions in a network of communicating client and server devices, said devices communicating in a non-session oriented client-server manner using a protocol with limited or no defined procedures to pass state information between client devices and server devices, said method comprises the steps of:
   a. communicating a plurality of independent requests for resources and actions requiring a transaction scope from a client device to a server device;
   b. generating and maintaining transaction identification information on said server device;
   c. aggregating each of said independent requests in a transaction, said transaction characterized by said transaction identification information;
   d. identifying at least one individual co-dependent resource server for accomplishing said transaction,
   e. wherein for each independent request, said aggregating step including: establishing execution process at said server device adapted to interface with an identified resource server, and associating each execution process with said transaction scope; and,
   f. implementing common commit coordinator for coordinating communication between each of said individual resource servers and said server device regarding commitment of said resources and actions, whereby said communication is accomplished independently of said established execution process.

2. The method of claim 1, further comprising steps of:
   g. reserving individual resource servers required to perform said transaction;
   h. creating a transaction identifier to indicate whether said transaction should be committed;
   i. executing said independent requests including at least one of said individual resource servers; and
   j. communicating said requested resources and completion of said actions from said server device to said client device.

3. The method of claim 2, wherein said transaction identification information includes a predetermined time period for performance of said transaction requested by said client device.

4. The method of claim 3, wherein step (i) is performed at said predetermined time period for said transaction requested by said client device.

5. The method of claim 4, wherein said server devices authenticate each of said plurality of independent requests for being communicated from authorized client devices.

6. The method of claim 5, wherein in step (b) said transaction identification information is generated after receiving a first of said independent requests and maintained for duration of said plurality of independent requests.

7. The method of claim 1, wherein said execution process includes implementing a CGI.

8. The method of claim 1, wherein said execution process includes implementing an ICAPI.

9. A computer program device readable by a machine, tangibly embodying a program of instructions executable by a machine to perform method steps for processing transactions in a network of communicating devices, said devices communicating in a non-session oriented client-server manner using a protocol with limited or no defined procedures to pass state information between client devices and server devices, said method comprises the steps of:
   a. communicating a plurality of independent requests for resources and actions requiring a transaction scope from a client device to a server;
   b. generating and maintaining transaction identification information on said server device;
   c. aggregating each of said independent requests in a transaction, said transaction characterized by said transaction identification information; and
   d. identifying at least one individual resource server to be co-dependent in accomplishing said transaction.
   e. wherein for each independent request, said aggregating step including: establishing execution process at said server device adapted to interface with an identified resource server, and associating each execution process with said transaction scope; and,
   f. implementing common commit coordinator for coordinating communication between each of said individual resource servers and said server device regarding commitment of said resources and actions, whereby said communication is accomplished independently of said established execution process.

10. The method of claim 8, further comprising steps of:
   g. reserving individual resource servers required to perform said transaction;
   h. creating a transaction identifier to indicate whether said transaction should be committed;
   i. executing said independent requests including at least one of said individual resource servers; and
   j. communicating said requested resources and completion of said actions from said server device to said client device.

11. The method of claim 10, wherein said transaction identification information includes a predetermined time period for performance of said transaction requested by said client device.

12. The method of claim 11, wherein step (i) is performed at said predetermined time period for said transaction requested by said client device.

13. The method of claim 12, wherein said server devices authenticate each of said plurality of independent requests for being communicated from authorized client devices.

14. The method of claim 13, wherein in step (b) said transaction identification information is generated after receiving a first of said independent requests and maintained for duration of said plurality of independent requests.

15. The computer program device readable by a machine as claimed in claim 8 wherein said execution process includes implementing a CGI.

16. The computer program device readable by a machine as claimed in claim 9 wherein said execution process includes implementing an ICAPI.

* * * * *